United States Patent
Pandy

(10) Patent No.: US 10,089,882 B2
(45) Date of Patent: Oct. 2, 2018

(54) METHOD FOR CONTROLLING AN OWN VEHICLE TO PARTICIPATE IN A PLATOON

(71) Applicant: WABCO Europe BVBA, Brussels (BE)

(72) Inventor: Ananda Pandy, Troy, MI (US)

(73) Assignee: WABCO Europe BVBA, Brussels (BE)

( * ) Notice: Subject to any disclaimer, the term of this patent is extended or adjusted under 35 U.S.C. 154(b) by 178 days.

(21) Appl. No.: 15/271,273

(22) Filed: Sep. 21, 2016

(65) Prior Publication Data
US 2018/0082591 A1    Mar. 22, 2018

(51) Int. Cl.
| | |
|---|---|
| *G05D 1/00* | (2006.01) |
| *G08G 1/00* | (2006.01) |
| *B60W 10/04* | (2006.01) |
| *B60W 10/18* | (2012.01) |
| *B60W 30/09* | (2012.01) |
| *B60W 30/16* | (2012.01) |

(Continued)

(52) U.S. Cl.
CPC ............ *G08G 1/22* (2013.01); *B60W 10/04* (2013.01); *B60W 10/18* (2013.01); *B60W 30/09* (2013.01); *B60W 30/16* (2013.01); *B60W 40/08* (2013.01); *G07C 5/0808* (2013.01); *B60W 2040/0827* (2013.01); *B60W 2400/00* (2013.01); *B60W 2550/10* (2013.01); *B60W 2550/30* (2013.01); *B60W 2710/18* (2013.01); *B60W 2720/10* (2013.01)

(58) Field of Classification Search
CPC ........ G08G 1/22; B60W 10/04; B60W 30/09; B60W 30/16; B60W 40/08; B60W 10/18; B60W 2550/10; B60W 2550/30; B60W 2710/18; B60W 2720/10; B60W 2040/0827; B60W 2400/00; G07C 5/0808
See application file for complete search history.

(56) References Cited

U.S. PATENT DOCUMENTS

| | | |
|---|---|---|
| 6,604,038 B1 | 8/2003 | Lesesky et al. |
| 7,005,977 B1 | 2/2006 | Tengler et al. |

(Continued)

FOREIGN PATENT DOCUMENTS

| | | |
|---|---|---|
| EP | 2383710 A1 | 11/2011 |
| WO | WO 2014145918 A1 | 9/2014 |

*Primary Examiner* — Ian Jen
(74) *Attorney, Agent, or Firm* — Leydig, Voit & Mayer, Ltd.

(57) ABSTRACT

A method for controlling an own vehicle to participate in platoon with at least one other vehicle, wherein the own vehicle and the at least one other vehicle each having communication devices configured to wirelessly transmit DSRC-signals over a vehicle-to-vehicle communication link between each other. The method includes checking initiation conditions to determine if the own vehicle is ready for platooning, identifying at least one other vehicle in signal-transmittal-range to determine if the at least one other vehicle is ready for platooning and the at least one other vehicle is a valid platooning partner, and requesting to an adaptive cruise control system to hold a following-distance between the own vehicle and the at least one other vehicle to form a platoon if the at least other vehicle is ready for platooning and is a valid platooning partner and if the own vehicle is assigned as a following vehicle.

18 Claims, 5 Drawing Sheets

(51) Int. Cl.
*B60W 40/08* (2012.01)
*G07C 5/08* (2006.01)

(56) References Cited

U.S. PATENT DOCUMENTS

| | | | |
|---|---|---|---|
| 8,352,111 | B2 | 1/2013 | Mudalige |
| 8,930,041 | B1 | 1/2015 | Grimm et al. |
| 9,953,533 | B1* | 4/2018 | Graves .................. G08G 1/162 |
| 2012/0109421 | A1 | 5/2012 | Scarola |
| 2013/0211624 | A1 | 8/2013 | Lind et al. |
| 2015/0199902 | A1 | 7/2015 | Hayee et al. |
| 2015/0271201 | A1 | 9/2015 | Ruvio et al. |
| 2015/0349885 | A1 | 12/2015 | Endo |
| 2016/0137089 | A1 | 5/2016 | Wu et al. |
| 2018/0082591 | A1* | 3/2018 | Pandy .................. B60W 10/04 |
| 2018/0114439 | A1* | 4/2018 | Graves .................. G08G 1/162 |

* cited by examiner

METHOD FOR CONTROLLING AN OWN VEHICLE TO PARTICIPATE IN A PLATOON

FIELD

The invention generally relates to a method for controlling a vehicle, for example a commercial vehicle, to participate in a platoon, and to a communication device for performing such method.

BACKGROUND

Commercial vehicles, for example trucks, driving in a row can drive more efficiently as a result of using the slipstream or the shadow zone of a vehicle in front to reduce wind resistance. Controlling the vehicles driving in a so called platoon or convoy is typically done by a lead vehicle which wirelessly sends messages and commands over a vehicle-to-vehicle communication network to the other vehicles of the platoon—which may be referred to as the follower vehicles.

The follower vehicles and vehicles not participating in the platoon can send requests to the lead vehicle, e.g., requests to change a position within the platoon or requests to join the platoon, and the lead vehicle can agree to or reject the request depending on certain rules, e.g., rules based on vehicle equipment, etc.

The lead vehicle can also change a formation of the platoon, e.g., change a formation of the platoon in response to the geometry of the road to form a more efficient platoon. The platoon in these cases is always controlled by the lead vehicle. To join a platoon it is often necessary that each vehicle who wants to join has to have the same platooning equipment as the other vehicles as a result of a lack of standardization in vehicle-to-vehicle communication. Often an interne connection with cloud access is required to find a safe vehicle for platooning.

In U.S. Pat. No. 8,352,111 B2, a platoon vehicle management is described that allows for the formation of a platoon by assigning a lead vehicle to control an emerging platoon. The lead vehicle receives messages and commands, processes these messages and commands, and transmits appropriate answers to the follower vehicles to control their driving behavior while they are participants in the platoon.

In US 2013/0211624 A1, a platoon is described that is controlled by a lead vehicle, wherein the lead vehicle sends control commands, e.g. to adjust the speed, at certain control points. The control points are defined by a common time base valid for each vehicle. The lead vehicle can also determine following distances between the vehicles of the platoon, wherein the following distances are calculated in dependence on vehicle characteristics, e.g. a dynamic braking behavior.

U.S. Pat. No. 8,930,041 B1 describes a wireless safety device connected to a controller area network (CAN) bus of the vehicle to receive and send information. The safety device can use a vehicle-to-vehicle communication to send messages about certain events, e.g. safety events, to other vehicles, wherein the messages are extracted from the information transmitted over the CAN bus. This allows for warnings to be provided to the drivers of the vehicles if a safety condition is received from another vehicle.

U.S. Pat. No. 6,604,038 describes the possibility of wirelessly establishing a remote data link between a vehicle and an interrogation device, e.g. in an assembly line, in a freight or rental car return depot. Therefore a data bus of a vehicle is connected to a transceiver over a processor allowing for the exchange of messages with the interrogation device.

SUMMARY

In an embodiment, the present invention provides a method for controlling an own vehicle to participate in platoon with at least one other vehicle, wherein the own vehicle and the at least one other vehicle each having communication devices configured to wirelessly transmit DSRC-signals over a vehicle-to-vehicle communication link between each other. The method includes checking initiation-conditions to determine if the own vehicle is ready for platooning, wherein the checking of the initiation-conditions comprises monitoring on-board messages transmitted over an on-board-communication system of the own vehicle, identifying at least one other vehicle in signal-transmittal-range to determine if the at least one other vehicle is ready for platooning and the at least one other vehicle is a valid platooning partner, wherein the identification of the at least one other vehicle comprises monitoring DSRC-messages wirelessly transmitted over the vehicle-to-vehicle-communication between the at least one other vehicle and the own vehicle by the DSRC-signal, and requesting to an adaptive cruise control system to hold a following-distance between the own vehicle and the at least one other vehicle to form a platoon if the at least other vehicle is ready for platooning and is a valid platooning partner and if the own vehicle is assigned as a following vehicle, wherein an assignment as a following vehicle is made if a brake-performance-value of the own vehicle transmitted as an on-board message over the on-board-communication system contains a higher stopping distance performance rank as the brake-performance-value of the at least other vehicle transmitted as an DSRC-message over the vehicle-to-vehicle-communication.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
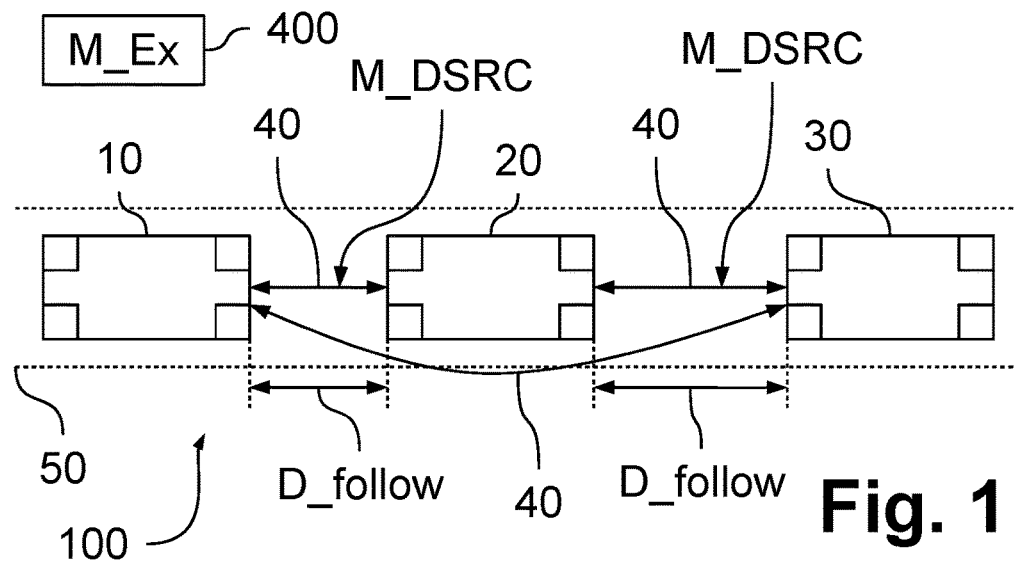
FIG. 1 shows an exemplary platoon with three participants according to an embodiment of the invention.

A method to safely engage or disengage a platoon or convoy between a pair of vehicles including but not limited to commercial vehicles with trailers, without being reliant on a cellular connection, e.g. GSM or UMTS, is described herein. Various embodiment of the invention described herein utilize wireless vehicle-to-vehicle communication allowing standardized data-exchange between the vehicles to safely identify and engage in platooning with a valid partner.

In an embodiment, a method for controlling an own vehicle to participate in a platoon with at least one other vehicle is provided. The own vehicle and the at least one other vehicle each have a communication device operable to wirelessly transmit and receive DSRC-signals over a wireless vehicle-to-vehicle communication between each other.

The method comprises checking several initiation-conditions to determine if the own vehicle is ready for platooning. This comprises monitoring on-board-messages that are transmitted over an on-board-communication system, e.g. a controller area network (CAN) of the own vehicle, to the communication device. After checking these initiation-conditions and determining that the own vehicle is ready for platooning, other vehicles in signal-transmittal-range of the own vehicle's communication device are identified to determine if at least one other vehicle is also ready for platooning. For this, DSRC-messages wirelessly transmitted over a vehicle-to-vehicle-communication link are analyzed by the own vehicle's communication module.

Further it is determined if said other vehicle is valid for platooning, wherein the validity is determined by analyzing one or more of a brake-performance-value of the at least one other vehicle, a geographical position of the at least one other vehicle, or a unique identifier of the at least one other vehicle, wherein all such information is wirelessly broadcast as DSRC-messages over the air.

By determining the brake-performance-value it is determined, if the at least one other vehicle driving, e.g. in front, can be assigned as a lead vehicle of the platoon, and/or if the at least one other vehicle driving behind can be assigned as a following vehicle, wherein: an assignment as a following vehicle is only made if the brake-performance-value of the at least one other vehicle driving behind comprises a higher stopping distance performance rank as the own vehicle, and an assignment as a lead vehicle is only made if the brake-performance-value of the at least one other vehicle driving in front comprises a lower stopping distance performance rank relative to the own vehicle.

The brake-performance-value or the stopping distance performance rank in this case is used to determine, if the own vehicle has a better or a lower braking performance relative to the at least one other vehicle. Thus the at least one other vehicle is only a valid platooning partner if the brake-performance-value is suitable to the position relative to the own vehicle, e.g. in front or behind. This is to prevent the at least one other vehicle or the own vehicle from crashing into the own vehicle or the at least one other vehicle due to a lower braking performance. In this manner, participants of the platoon can be arranged by their braking performance to allow improved following-distances between the vehicles of the platoon.

According to a preferred embodiment, the arrangement of the vehicles in a platoon or the validity of a platooning partner can additionally or alternatively be set in dependence of a vehicle mass of the own vehicle or a driving behavior, to determine if the own vehicle is rather suitable as a following or a lead vehicle. This information can be transmitted to the communication-module over the on-board communication system by the on-board messages.

If the own vehicle is assigned as a following vehicle, a request to an adaptive cruise control system can be output by a control-signal over the on-board-communication system of the own vehicle to hold a certain following-distance between the own vehicle and the at least one other vehicle to form a platoon. According to one aspect of the invention the said following-distance can optionally be set in dependence of a restriction-value, whereas the restriction-value is transmitted over a restriction-message, e.g. by an external communication system. If no restrictions are given, a request is sent to the adaptive cruise control system over the on-board-communication system to set a certain distance-mode to e.g. hold the shortest following-distance possible for the own vehicle setup, e.g. the braking performance. The shortest following-distance or the distance-mode in this case is e.g. parameterized for the own vehicle in the adaptive cruise control system or in the communication-module itself.

Thus the following-distance between the participants of the platoon is not controlled by the lead vehicle but from the adaptive cruise control system which is holding the shortest following-distance possible for the own vehicle. As the vehicles of the platoon are arranged by their braking performances it is ensured that the vehicles in the platoon are not crashing into each other even if every vehicle is braking with its highest possible braking performance, e.g. in an evasive maneuver, as the following-distance set by the adaptive cruise control system is based upon the braking possibilities of the own vehicle.

Thus the following distance is controlled by every vehicle in the platoon individually. So there is no control-command coming from the lead vehicle as holding a certain distance is managed by the communication-module in each vehicle individually by monitoring the DSRC-messages, in particular the brake-performance-value, wirelessly transferred over the vehicle-to-vehicle communication as well as the information or on-board-messages provided by the own vehicles on-board-communication system.

By monitoring the DSRC-messages and the on-board messages during the platooning process the own vehicle can hold a shorter following-distance in contrast to a situation where the own vehicle follows the other vehicle just using the adaptive cruise control system combined with the advanced emergency braking system as in this case the following distance cannot be set to the shortest possible distance due to safety restrictions.

According to an embodiment of the invention the communication device is physically connected to the on-board communication system to receive the on-board-messages from other system components of the own vehicle. This includes but not limited to, e.g. a vehicle speed, the brake-performance-value, the geographical position of the own vehicle recorded from a navigation satellite system, e.g. GPS, GLONASS, or the like, a diagnose-message containing information, if the vehicle hardware, e.g. an anti-lock braking system, an electronic stability control, the adaptive cruise control system combined with an advanced emergency braking system, is fully operational or faults are occurring, or an unique identifier for the own vehicle.

The communication device further comprises a processor to monitor the individual on-board-messages transferred over the on-board communication system to the communication device and to generate the DSRC-signal containing the DSRC-messages which are wirelessly broadcasted over the vehicle-to-vehicle communication to other vehicles in signal-transmittal-range.

The DSRC-messages wirelessly transmitted over the air e.g. are the brake-configuration-message specifying a brake performance of the vehicle, a geographical-position-message specifying a geographical position recorded from a navigation satellite system, e.g. GPS, GLONASS, or the like, a vehicle-identification-message specifying an unique identifier, e.g. a fleet and/or original equipment manufacturer (OEM), a platoon-status-message specifying in particular the results from checking the initiation-conditions, the identification-conditions as described above or disengagement-conditions, and a platoon-position-message specifying the position of the vehicle in the platoon, e.g. lead vehicle or following vehicle.

Further the communication device is able to monitor the incoming DSRC-signals from other vehicles, to generate control-signals and to transfer the control-signals to the on-board communication to request in particular the adaptive cruise control system to hold the appropriate following distance evaluated from the DSRC-signal of the other vehicles.

Optionally the communication device is able to gain information from the external communication system over external-messages using cellular connection, e.g. fee-based connection protocols of cellular networks, e.g. GSM or UMTS, to gain additional information to optimize the platooning process. This is not mandatory as platooning is also possible just by using the DSRC-messages and the on-board-messages. An external-message for example is the restriction-message mentioned above.

According to a preferred embodiment, the following distance can further be adjusted in dependence of the traffic, the weather or environmental data which can be transferred as an external-message or an on-board message. It is also possible to capture traffic signs captured by a sign-recognition. Thus the distance-mode set by the adaptive cruise control system can also be set to hold a longer following distance if e.g. the friction coefficient is lower or the advanced emergency braking system detects a higher traffic volume or the external communication system sends an external-message characterizing the traffic. Also the road curvature or the recognition of certain traffic signs can be taken into account to command a different distance-mode to the adaptive cruise control system of the own vehicle for setting a longer following distance.

According to a preferred embodiment, the checking of initiation-conditions comprises determining if the electronic braking system of the own vehicle is working properly, namely if the anti-lock braking system, the electronic stability control, the adaptive cruise control system combined with the advanced emergency braking system are working fault free, wherein this is done by analyzing the diagnose-message transferred over the on-board-communication system of the own vehicle. This ensures that the requested following-distance can be safely set. This checking is preferably done permanently in the background throughout the platooning process to be able to determine if faults are occurring and to stop the own vehicle from platooning if appropriate.

According to a preferred embodiment, the checking of the initiation-conditions further comprises the steps of determining if the anti-lock braking system and the electronic stability control are fully operational and determining if the cruise control system of the own vehicle is activated. This ensures that the stability of the vehicle is guaranteed during platooning.

According to a preferred embodiment, the checking of the initiation-conditions further comprises determining if no disengagement-condition is met, wherein a disengagement-condition is met, if the driver presses the braking pedal or if the adaptive cruise control system shuts off or is overridden or if there is a forward collision warning or any other collision warnings outputted by the advanced emergency braking system or if there is a lane departure warning or if a turn-signal or a hazard light signal is activated or if a restriction-value sends "no approval" or if the diagnose-message is indicating that the electronic braking system is not working fault free any more or if the following-distance derived from a geographical-position-value is not matching the following-distance outputted from the adaptive cruise control system of the own vehicle within a tolerance-distance or if the geographical-positioning-value indicates that the own vehicles and the at least one other vehicle are not driving in the same lane of travel any more for more than 2 s or if there is a failure in data transmission of the DSRC-signal. This ensures that a platoon can be established without other vehicles disturbing engagement.

According to a preferred embodiment, the checking of the initiation-conditions further comprises determining if the driver of the own vehicle is drowsy. This can be done by e.g. analyzing the eyes of the driver with a camera or detecting the steering behavior of the driver.

According to a preferred embodiment, identifying the at least one other vehicle comprises the steps of determining a platoon-status-value contained in the platoon-status-message received from the at least one other vehicle over the DSRC-signal to find out, if the at least one other vehicle is ready and also initiated to engage to the platoon.

Further it is determined, if the same unique identifier contained in the vehicle-identification-message is broadcasted over the DSRC-signal by more than two other vehicles in signal-transmittal-range, meaning more than two vehicles are available for platooning. In this case, filtering of the own vehicle and the at least one other vehicle is done based on their geographical-position-value contained in the geographical-position-message broadcasted over the DSRC-signal to identify the geographical position of the own vehicle relative to the at least one other vehicle. This is done to find out which of the more than two other vehicles is a valid platooning partner, meaning which of the other vehicles is driving behind or in front in the same lane with the appropriate brake-configuration-value. Optionally the following-distance derived from the geographical-position-value can be compared to the following-distance outputted from the adaptive cruise control system to check for plausibility.

According to a preferred embodiment, identifying the at least one other vehicle comprises the steps of determining if the at least one other vehicle is of the same or a friendly fleet, e.g. by analyzing the unique identifier which is wirelessly transferred over the vehicle-to-vehicle communication by the DSRC-signal. Thus the own vehicle is only allowed to platoon with another vehicle of the same or a friendly fleet.

According to a preferred embodiment, requesting the adaptive cruise control system to hold a following-distance is done only if the own vehicle is driving at a vehicle-speed equal to or less than a maximum vehicle-speed, e.g. 65 mph, or equal or more that a minimum vehicle-speed, e.g. 40 mph and the own vehicle and the other vehicle are ready for platooning and the other vehicle is valid and transmission of DSRC-signals as well as the relative position to each other is consistent over a verification-time of e.g. 120 s. The maximum and the minimum vehicle-speed can e.g. be determined in dependence of a sign-recognition.

According to a preferred embodiment, before requesting the adaptive cruise control system to hold a following-distance the restriction-value contained in the restriction-message is checked, wherein the adaptive cruise control system is requested to hold a short following distance as the following-distance of the own vehicle relative to the at least one other vehicle if the restriction-value comprises "no restrictions". If the restriction-value comprises "limited approval" the adaptive cruise control system is requested to hold a medium following distance as the following-distance and if the restriction-value comprises "no approval" the adaptive cruise control system is requested to hold a long following distance as the following-distance. Disengagement can be controlled by the communication device if one of the disengagement conditions mentioned above is met.

Depicted in FIG. 1 is a schematic view of a platoon 100 with a lead vehicle 10, in particular a commercial vehicle as for example a truck e.g. with a trailer or a tractor with a semi-trailer, and two follower vehicles 20, 30 as participants of the platoon 100. Wireless data communication between the vehicles 10, 20, 30 of the platoon 100 is established by using a wireless vehicle-to-vehicle (V2V) communication 40, preferably using radio signals in the ISM-Band, e.g. using a dedicated short range communication (DSRC) or Bluetooth. Using the V2V-communication 40 the vehicles 10, 20, 30 in the platoon 100 can send and receive DSRC-messages M_DSRC to control and monitor the platoon formation, e.g. identifying vehicles for platooning, determine safe conditions to engage a platoon 100 with a certain following distance D_follow between the vehicles 10, 20, 30 and to disengage a platoon 100. Without limitation the platoon 100 can also consist of just two or more than three vehicles 10, 20, 30.

Figure 2:
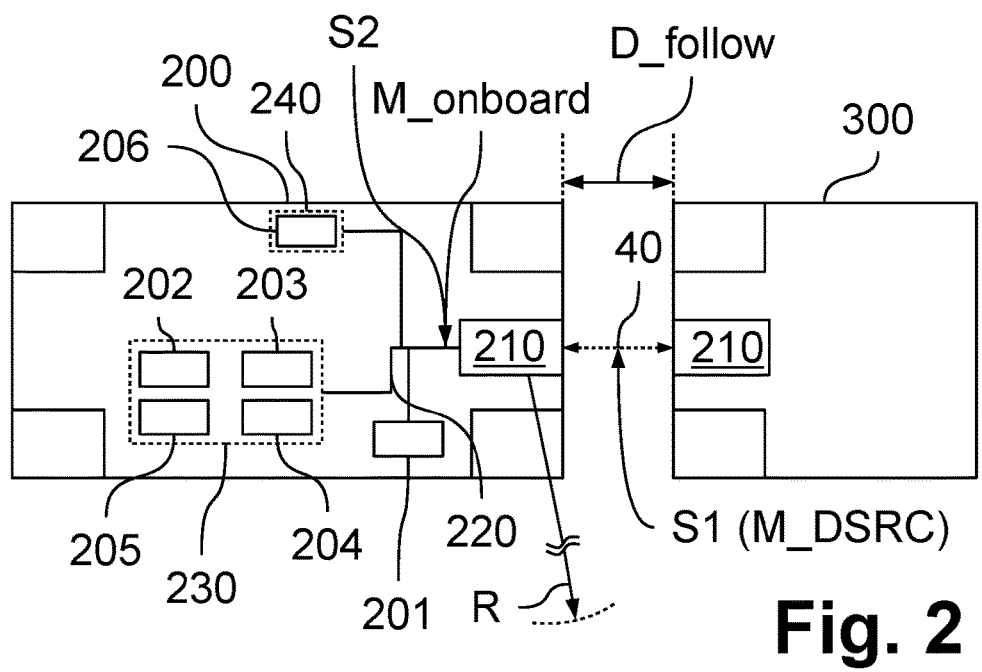
FIGS. 2 and 3 schematically show the vehicle equipment with a communication-device according to an embodiment of the invention.

FIG. 2 depicts an exemplary view of the own vehicle 200, which is capable of being a lead vehicle 10 or a following vehicle 20, 30 in a platoon 100 according to FIG. 1. The own vehicle 200 comprises a communication device 210 for establishing a wireless V2V-communication 40 to one or more other vehicles 300 who are in signal-transmittal-range R. The communication device 210 can include a processor, e.g. a baseband processor, configured to manage various signaling, e.g. radio transmission and reception, functions, and can additionally include an antenna configured to act as both a transmitter and receiver for various signals. The communication device 210 further wirelessly broadcasts a DSRC-signal S1 containing DSRC-messages M_DSRC which can be recorded and processed from the other vehicles 300 in signal-transmittal-range R having the same or a comparable communication device 210, also being able to receive and process the DSRC-messages M_DSRC. In turn the communication device 210 in the own vehicle 200 can also receive DSRC-signals S1 from the other vehicle 300 in signal-transmittal-range R. The signal-transmittal-range R of the communication device 210 is a circle with a radius of at least about 150 m allowing data-exchange with at least three or more vehicles 10, 20, 30 driving in a row. The DSRC-signals S1 are broadcasted and received by a DSRC-radio 212.

The communication device 210 is physically connected to an on-board communication system 220 of the own vehicle 200, e.g. a Controller Area Network (CAN) Bus, over and on-board interface 211 to gain vehicle information or parameters transferred over on-board-messages M_onboard by the on-board communication system 220 and to transmit control-signals S2 to the own vehicle equipment, e.g. an electronic braking system 230 and/or a powertrain-system 240, to request deceleration or acceleration of the own vehicle 200 in dependence of the DSRC-messages M_DSRC received over the DSRC-signal S1 from other vehicles 300 in range.

The electronic braking-system 230 further contains or is connected to an anti-lock braking system 202 (ABS), an electronic stability control 203 (ESC) and an adaptive cruise control 204 (ACC) combined with an advanced emergency braking system 205 (AEBS). The combination of the adaptive cruise control 204 with the advanced emergency braking system 205 should automatically maintain a safe following distance D_follow to another vehicle 300 in front and simultaneously help to avoid or reduce the impact of rear-end collisions by braking as needed. The powertrain-system 240 can further contain or be connected to a cruise control system 206 (CC) which automatically controls a vehicle-speed v_200 of the own vehicle 200 by accelerating to a pre-defined vehicle-speed v_pre.

Figure 3:
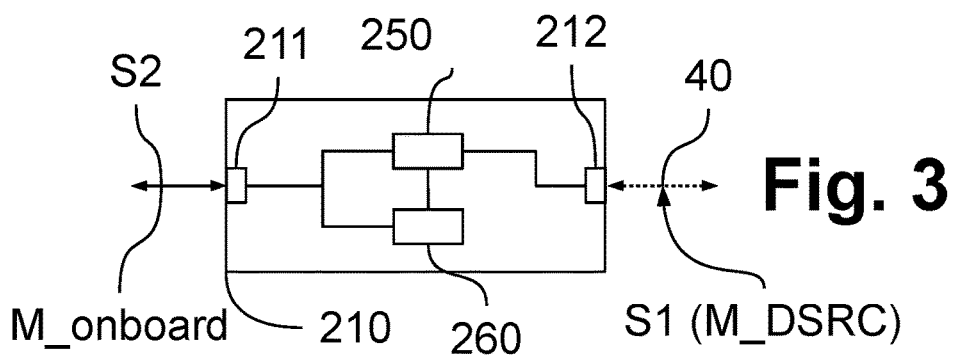

According to FIG. 3 the communication device 210 comprises a processor 250 which allows processing of the DSRC-messages M_DSRC contained in the DSRC-signal S1 received from the other vehicles 300 in signal-transmittal range R and monitoring of the on-board-messages M_onboard transferred over the on-board communication system 220. Depending on the received DSRC-messages M_DSRC the processor 250 can generate the control-signal S2 which is transmitted to the on-board communication system 220 and to the own vehicle equipment 230, 240 and which contains requests to the own vehicle equipment. Further the communication device 210 comprises or is connected to a memory 260 to store certain vehicle information or parameters transferred over the on-board-messages M_onboard by the on-board communication system 220. These on-board-messages M_onboard can also be processed by the processor 250 and be taken into account for generating the control-signal S2 as well as the DSRC-signal S1, as described later.

Thus the communication device 210 is able to monitor the own vehicle 200 over the on-board communication system 220 and to generate and wirelessly transmit DSRC_signals S1 to other vehicles 300 as well as receive and process the DSRC-signals S1 from the other vehicles 300 to generate the control-signal S2. The other vehicles 300 in range who might be involved in a platooning process can also monitor the DSRC-signal S1 of the own vehicle 200, e.g. in their own communication device 210. For this there is no need for an external communication system 400 to submit the DSRC-messages M_DSRC between the vehicles 200, 300, whereas the external communication system 400 is only operational with a cellular connection, e.g. GSM or UMTS network protocol, to gain access to e.g. a cloud-based system. Only optionally certain external messages M_ex from the external communication system 400 can be received and processed to generate the DSRC-signal S1. But this is not mandatory to be able to find an appropriate platooning partner.

The DSRC-signal S1 received from other vehicles 300 and sent by the own vehicle 200 wirelessly over the V2V-communication 40 might for example contain the following DSRC-messages M_DSRC: at first a platoon-status-message M_status is transmitted over the DSRC-signal S1, which might, for example, take the following platoon-status-values platoon_status, e.g. coded as binary numbers, system is not ready
system is ready and initiated
vehicle with communication device is detected but not a valid partner
platoon partner identified
platoon engaged
platoon disengaged.

The platoon-status-message M_status is used to exchange general information during or before a platooning process, e.g. to identify a potential partner for platooning or express the wish to platoon with another vehicle 300. The communication device 210 can wirelessly report the platoon-status-message M_status over the DSRC-signal S1, which applies for the own vehicle 200.

Further a platoon-position-message M_position is transmitted over the DSRC-signal S1 giving the information, if the own vehicle 200 is classified as a lead vehicle 10 or as a following vehicle 20, 30 or is not platooning at all. The platoon-position-message M_position can for example take the following platoon-position-values platoon_position:
  not platooning
  lead vehicle of the platoon
  following vehicle of the platoon The communication device 210 can wirelessly report the platoon-position-message M_position over the DSRC-signal S1, which applies for the own vehicle 200.

Further the DSRC-signal S1 can transmit a brake-configuration-message M_brake, which characterizes the braking performance of the own vehicle 200 and which can be reported over the DSRC-signal S1 using a brake-performance-value conf_brake. The brake-performance-value conf_brake can take several stopping distance performance ranks R.i, giving an estimation about the possible stopping distance D_stop achievable with the braking-system 230 used in the own vehicle 200. The stopping distance performance ranks R.i might for example be classified as follows:
  A first stopping distance performance rank R.1 is given to a vehicle 200 containing three axles with each tire on these three axles comprising disc-brakes.
  A second stopping distance performance rank R.2 is given to a vehicle 200 containing two axles with each tire on these two axles comprising disc-brakes.
  A third stopping distance performance rank R.3 is given to a vehicle 200 containing three axles with each tire on the front axle comprising disc-brakes and all other tires comprising drum brakes.
  A forth stopping distance performance rank R.4 is given to a vehicle 200 containing two axles with each tire on the front axle comprising disc-brakes and each tire on the rear axle comprising drum brakes.
  A fifth stopping distance performance rank R.5 is given to a vehicle 200 containing three axles with each tire on these three axles containing drum brakes.
  A sixth stopping distance performance rank R.6 is given to a vehicle 200 containing two axles with each tire on these two axles containing drum brakes.

The lower the index "i" of the stopping distance performance rank R.i is, the better is the braking performance or the lower is the stopping-distance D_stop of the respective vehicle 200, 300. To transmit the braking performance over the DSRC-signal S1 the stopping distance performance rank R.i is used as the brake-performance-value conf_brake in the above mentioned DSRC-message M_brake. There might be more stopping distance performance ranks R.i to describe the braking performance of further braking setups. Thus by wirelessly receiving a brake-configuration-message M_brake from another vehicle 300 over the DSRC-signal S1 the own vehicle 200 is able to estimate the braking performance of this other vehicle 300.

Further the DSRC-signal S1 can comprise a geographical-position-message M_gp witch transfers the latitude and the longitude of the own vehicle 200 as graphifcal-position-values pos_gp using graphical-positioning-coordinates established by a navigation satellite system, e.g. GPS, GLONASS or the like, in the own vehicle 200. The geographical-position-message M_gp can be reported over the DSRC-signal S1 to inform other vehicles 300 about the geographical position of the own vehicle 200 and vice versa.

Further a vehicle-identification-message M_ID can be transferred in the DSRC-signal S1 which characterizes the fleet and the original equipment manufacturer (OEM) of the own vehicle 200 by using a unique identifier ID.

The vehicle-identification-message M_ID, the brake-configuration-message M_brake and the geographical-position-message M_gp are information concerning the own vehicle 200 and the respective values ID, conf_brake, pos_gp are transferred by the on-board message M_onboard by the on-board communication system 220—or from the memory 260—to the communication device 210 which generates DSRC-messages M_DSRC for the DSRC-signal S1 out of these on-board message M_onboard containing these values ID, conf_brake, pos_gp.

Figure 4:
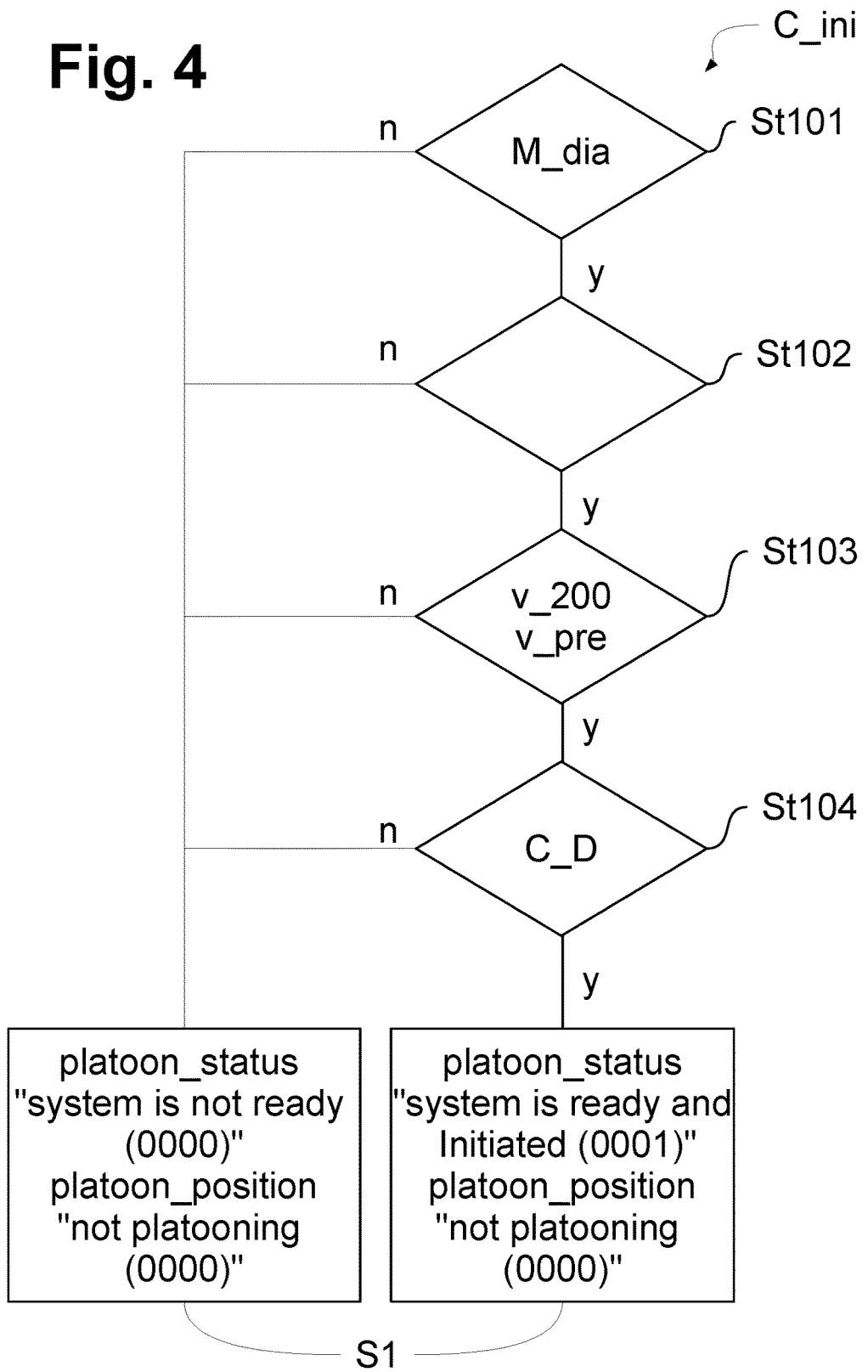
FIG. 4 shows a flow chart of the initiation process according to an embodiment of the invention.

The platoon-status-message M_status and the platoon-position-message M_position are in turn generated in the communication device 210 after checking certain conditions C_ini, C_id, C_e, C_d regarding the platooning process:
  For initiating a platoon 100, i.e. the own vehicle 200 is in unitary driving mode whilst the other vehicles 300 are also driving unitary or already participate in a platoon 100 and the own vehicle 200 is approaching another vehicle 300, the platoon-status-message M_status for the own vehicle 200 might be set by the communication device 210 in dependence of initiation-conditions C_ini which are depicted in FIG. 4:
  In a first initiation-step St101 the communication device 210 checks, if the electronic braking system 230 of the own vehicle 200 is working properly, namely if the anti-lock braking system 202, the electronic stability control 203, the adaptive cruise control system 204 combined with the advanced emergency braking system 205 is working fault free. This can be determined by a diagnose-message M_dia which is transferred as an on-board-message M_onboard from the respective system 202, 203, 204, 205 to the on-board communication system 220 of the own vehicle 200, e.g. PGN 65226, and to the communication device 210.
  In a second initiation-step St102 the communication device 210 checks, if the anti-lock braking system 202 and the electronic stability control 203 are fully operational. This can for example be done by analyzing the on-board messages M_onboard provided by the respective system 202, 203 over the on-board communication system 220. In a third initiation-step St103 the communication device 210 checks if the cruise control system 206 of the own vehicle 200 is activated, thus if the vehicle-speed v_200 of the own vehicle 200 can be controlled in dependence of a pre-defined vehicle speed v_pre by the cruise control system 206 using the powertrain-system 240 of the own vehicle 200. This is necessary to be able to hold the following-distance D_follow to another vehicle 300 in the platoon 100, e.g. if the other vehicle 300 is in front and is speeding up.
  In a forth initiation-step St104 the communication device 210 checks if no disengagement-condition C_d is met, e.g. if the platoon-status-message M_status generated by the own communication device 210 does not report a platoon-status-value platoon_status="platoon disengaged". Thus it is checked if there are no conditions that prevents the own vehicle 200 from engaging to a platoon 100. Possible disengagement-conditions C_d are described in more detail in reference to FIG. 7 later.

If all the initiation-conditions C_ini checked in the initiation-steps St101, St102, St103, St104 are met, the platoon-status-value platoon_status is set to "system is ready and initiated". If any one of these conditions is not met, the platoon-status-value platoon_status is set to "system is not ready". As the own vehicle 200 is not participating in a platoon 100 yet, the platoon-position-value platoon_position is set to "not platooning".

These initiation-steps St101, St102, St103, St104 are checked permanently throughout the platooning process to be sure that the vehicle hardware is working properly to safely build a platoon with another vehicle 300.

The appropriate platoon-status-value platoon_status as well as the platoon-position-value platoon_position are then wirelessly broadcasted in the platoon-status-message M_status and the platoon-position-message M_position as DSRC-messages M_DSRC over the DSRC-signal S1 using the V2V-communication 40. Furthermore the vehicle-identification-message M_ID, the brake-configuration-message M_brake and the geographical-position-message M_gp are wirelessly broadcasted with the appropriate values ID, conf_brake, pos_gp for the own vehicle 200 over the DSRC-signal S1.

Figure 5:
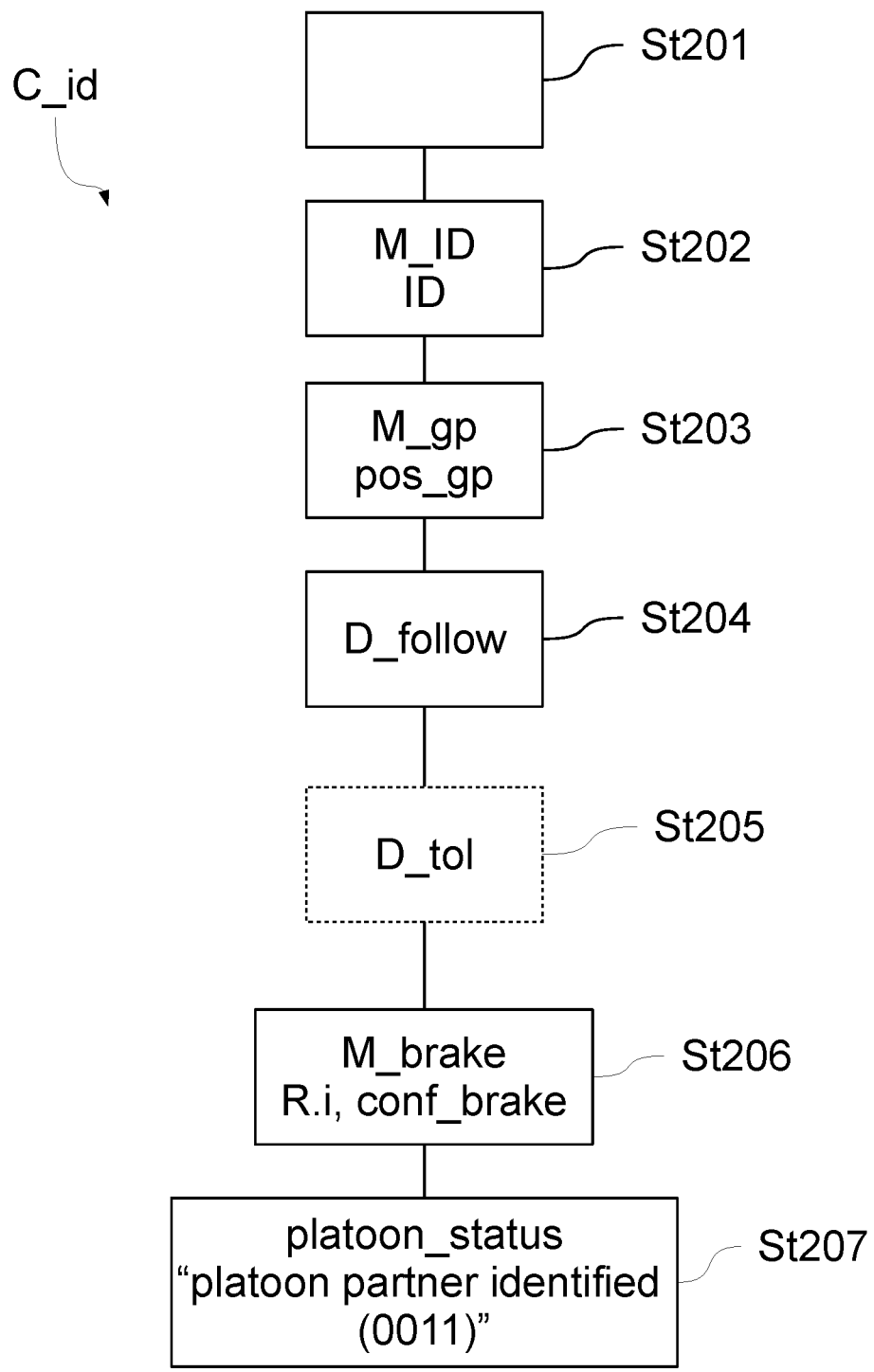
FIG. 5 shows a flow chart of the identification process according to an embodiment of the invention.

After finding out in the initiation-steps St101, St102, St103, St104 that the own vehicle 200 is initiated and ready for platooning, the communication device 210 tries to identify participants for a platoon 100 by checking identification-conditions C_id to find other suitable vehicles 300 for platooning, as depicted in FIG. 5. Therefore the validity of the other vehicles 300 is checked as follows: For this the communication device 210 in a first identification-step St201 checks, if other vehicles 300 in signal-transmittal-range R wirelessly broadcast a platoon-status-value platoon_status="system is ready and initiated" over the DSRC-signal S1.

Once other vehicles 300 with a platoon-status-value platoon_status="system is ready and initiated" are detected, the communication device 210 in a second identification-step St202 checks the wirelessly transmitted vehicle-identification-message M_ID of these other vehicles 300. If the vehicle-identification-message M_ID indicates that the other vehicle 300 has the same unique identifier ID or the other vehicle 300 is of a friendly fleet, the other vehicle is valid and can be verified as a potential platooning partner.

If there are more than two vehicles 200, 300 (own vehicle 200 included) in signal-transmittal-range R wirelessly broadcasting a vehicle-identification-message M_ID over the DSRC-signal S1 with the same or a friendly unique identifier ID, the communication device 210 in a third identification-step St203 filters the own vehicle 200 and the other vehicles 300 based on their geographical-position-value pos_gp wirelessly broadcasted over the geographical-position-message M_gp from the other vehicles 300 to the own vehicle 200. This is done to identify the exact positions of the other vehicles 300 relative to the own vehicle 200, e.g. if they are driving in the same lane or next to each other and who is driving upfront, and to determine how an engagement to the other vehicles 300 might be established. So if the geographical position pos_gp indicates e.g. that the other vehicle 300 is driving in another lane of travel, the other vehicle is not a valid partner and thus is not verified as a potential partner.

In a forth identification-step 204 the following-distance D_follow between the own vehicle 200 and the other vehicle 300, who is a potential platooning partner, is derived from the geographical-position-value pos_gp. In an optional fifth identification-step St205 the following-distance D_follow derived from the geographical position coordinates is compared to the following-distance D_follow outputted from the adaptive cruise control system 204 of the own vehicle 200 and it is checked if they match by a certain tolerance-distance D_tol. Thus the current following-distance D_follow of the approaching two vehicles 200, 300 is verified in detail.

In a sixth identification step St206 the brake-performance-value conf_brake or the stopping distance performance ranks R.i wirelessly broadcasted by the other vehicles 300 in the brake-configuration-message M_brake are checked in the communication module 210. If the brake-performance-value conf_brake between the own vehicles 200 and the other vehicles 300 does not match, then the vehicle 200, 300 with the higher stopping distance performance rank R.i or the better braking performance is only allowed to platoon as a following vehicle 20, 30, whereas the vehicle 200, 300 with the lower stopping distance performance rank R.i should be arranged at a lead position of the platoon 100.

If the other vehicle 300 has a stopping distance performance rank R.i which is not according to the braking requirement, then this other vehicle 300 should not be selected as a potential partner, meaning if the other vehicle 300 has a lower braking performance relative to the own vehicle 200 and is currently driving in front, the other vehicle 300 is not a valid partner. Same holds if the other vehicle 300 has a higher braking performance relative to the own vehicle 200 and is currently driving behind the own vehicle 200. Thus the potential vehicles 200, 300 to form the platoon are arranged by their stopping distance performance ranks R.i.

If another vehicle 300 with platoon_status="system is ready and initiated" is in signal-transmittal-range R but e.g. fails to meet the braking requirements (St206), the distance requirements (St205, St204), the position requirements (St203) or the identification requirements (St202) the platoon-status-value platoon_status is set to "vehicle with communication device is detected but not a valid partner."

In the background the initiation-conditions C_ini according to FIG. 4 are checked. The platoon-position-value platoon_position is set to "not platooning" if no valid partner is identified at all from the other vehicles 300 in signal-transmittal-range R. But if the communication device 210 finds out that there is a valid or potential platooning partner during the identification-steps St201 to St206, the platoon-status-value platoon_status is set to "platoon partner identified" in a seventh identification-step St207.

Once a valid platoon partner is identified, the respective platoon-position-value platoon_position shall be wirelessly reported over the DSRC-signal S1 based on the stopping distance performance rank R.i broadcasted over the brake-configuration-message M_brake. This is done as described in the sixth identification-step St206, e.g. the platoon-position-value platoon_position is set to "lead vehicle of the platoon" for the vehicle 200, 300 with the lowest stopping distance performance rank R.i and to "following vehicle of the platoon" for the vehicle 200, 300 with the highest stopping distance performance rank R.i.

Figure 6:
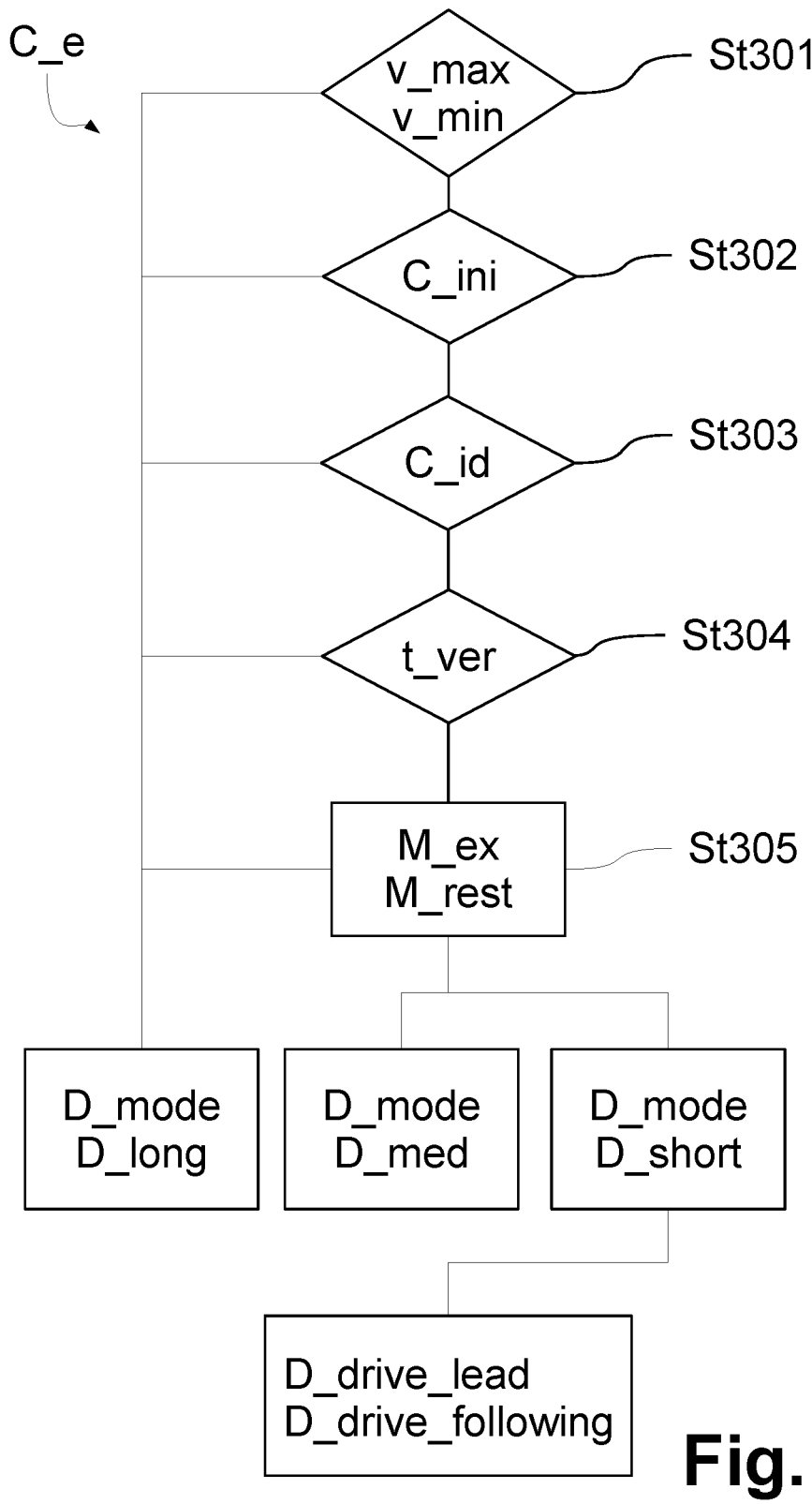
FIG. 6 shows a flow chart for engaging a platoon according to an embodiment of the invention.

After finding a potential platooning partner, engagement-conditions C_e for engaging a platoon 100 are checked, as depicted in FIG. 6. For this in a first engagement-step St301 it is checked if the own vehicle 200 is driving with a vehicle-speed v_200 in between a maximum vehicle-speed v_max, e.g. 65 mph, and a minimums vehicle-speed v_min, e.g. 40 mph. In a second engagement-step St302 the communication device 210 checks, if all the initiation-conditions C_ini already verified in the initiation-steps St101, St102, St103, St104 are still met to verify functionality of the own vehicles hardware. Afterwards in a third engagement-step St303 the communication device 210 checks, if there is still a valid platooning partner meeting the identification-conditions C_id, e.g. having the appropriate braking performance, unique identifier ID, geographical position pos_gp, etc., as already verified above. In a fourth engagement-step St304 for a verification-time t_ver of e.g. 120 s it is checked, if the transmission of DSRC-signals S1 as well as the vehicle positioning, e.g. the following-distance D_follow, between the own vehicle 200 and the other vehicle 300 as a potential platoon partner is consisted.

In an optional fifth engagement-step 305 external-messages M_ex, e.g. the restriction-messages M_rest, transferred from an external communication system 400, e.g. a cloud-based system operated using an internet-connection or using bluetooth, are checked if they contain a restriction-value platoon authorization of "no approval" or "limited approval" or "no restrictions". The restriction-message M_rest can be transmitted to the communication device 210 over a smartphone or a bluetooth connection. If there is no restriction-message M_rest received, the other vehicle 300 shall be treated as if there are "no restrictions".

If the engagement-conditions C_e in the engagement-steps St301 to St304 are met, there are "no restrictions" (St305) and the own vehicle 200 is classified as a following vehicle 20, 30 based on the stopping distance performance rank R.i (St206), the communication device 210 in a sixth engagement-step St306 requests the adaptive cruise control system 204 of the own vehicle 200 to switch into a certain distance-mode D_mode by outputting the appropriate control-signal S2 to the on-board communication system 220. The control-signal S2 is then received by the adaptive cruise control system 204 which makes sure that a certain following distance D_follow is kept which corresponds to the distance-mode D_mode.

In the above mentioned case a distance-mode D_mode is set which requests to hold the shortest following distance D_short possible for the own vehicle 200 relative to the other vehicle 300 in front, to actively follow the other vehicle 300 at a safe following-distance D_follow to safely forming a platoon 100.

If the restriction-value platoon_authorization in the fifth engagement-step St305 reports "limited approval", a distance-mode D_mode is set which requests to hold a medium following distance D_med to the other vehicle 300 in front. If the restriction-value platoon_authorization in the fifth engagement-step St305 reports "no approval", a distance mode D_mode should be set which requests to hold a longer following distance D_long to the other vehicle 300 in front.

The shortest possible following distance D_short, the medium following distance D_med and the longer following distance D_long might for example be parameterized for the own vehicle 200 in the adaptive cruise control system 204 or might be transferred from the communication device 210.

To achieve safe platooning of the own vehicle 200 with other vehicles 300 at this stage of the platooning process the communication device 210 is able to send the distance-mode D_mode to the adaptive cruise control system 204 which is combined with the advanced emergency braking system 205 over the control-signal S2. Thus the adaptive cruise control system 204 can hold the requested following distance D_follow to the other vehicle 300 in front if the own vehicle 200 is defined as a following vehicle 20, 30. Simultaneously the advanced emergency braking system 205 ensures safe driving behind the other vehicle 300.

If the own vehicle 200 follows the other vehicle 300 at a certain following distance D_follow defined by the distance mode D_mode, the platoon-status-value platoon_status is set to "platoon engaged" and the platoon-position-value platoon_position is set to "following vehicle of the platoon".

If the own vehicle 200 is engaged in the platoon 100 and is following at a short following distance D_short according to the distance-mode D_mode the individual lead-driving-distance D_drive_lead travelled by the lead vehicle 10 of the platoon and the individual following-driving-distance D_drive_following travelled by the own vehicle 200 as a following vehicle 20, 30 is calculated and reported by the communication device 210. The communication module 210 shall also store the following-driving-distance D_drive_follow and the lead-driving-distance D_drive_lead in the memory 260 to find out the amount of platooning miles collected by the own vehicle 200. This can e.g. be used for platoons 100 with vehicles having different unique identifiers ID.

These platooning miles can also be transferred to the external communication system 400 to evaluate a restriction-value platoon_authorization for the own vehicle 200 driving as the following vehicle 20, 30 of a platoon 100.

Figure 7:
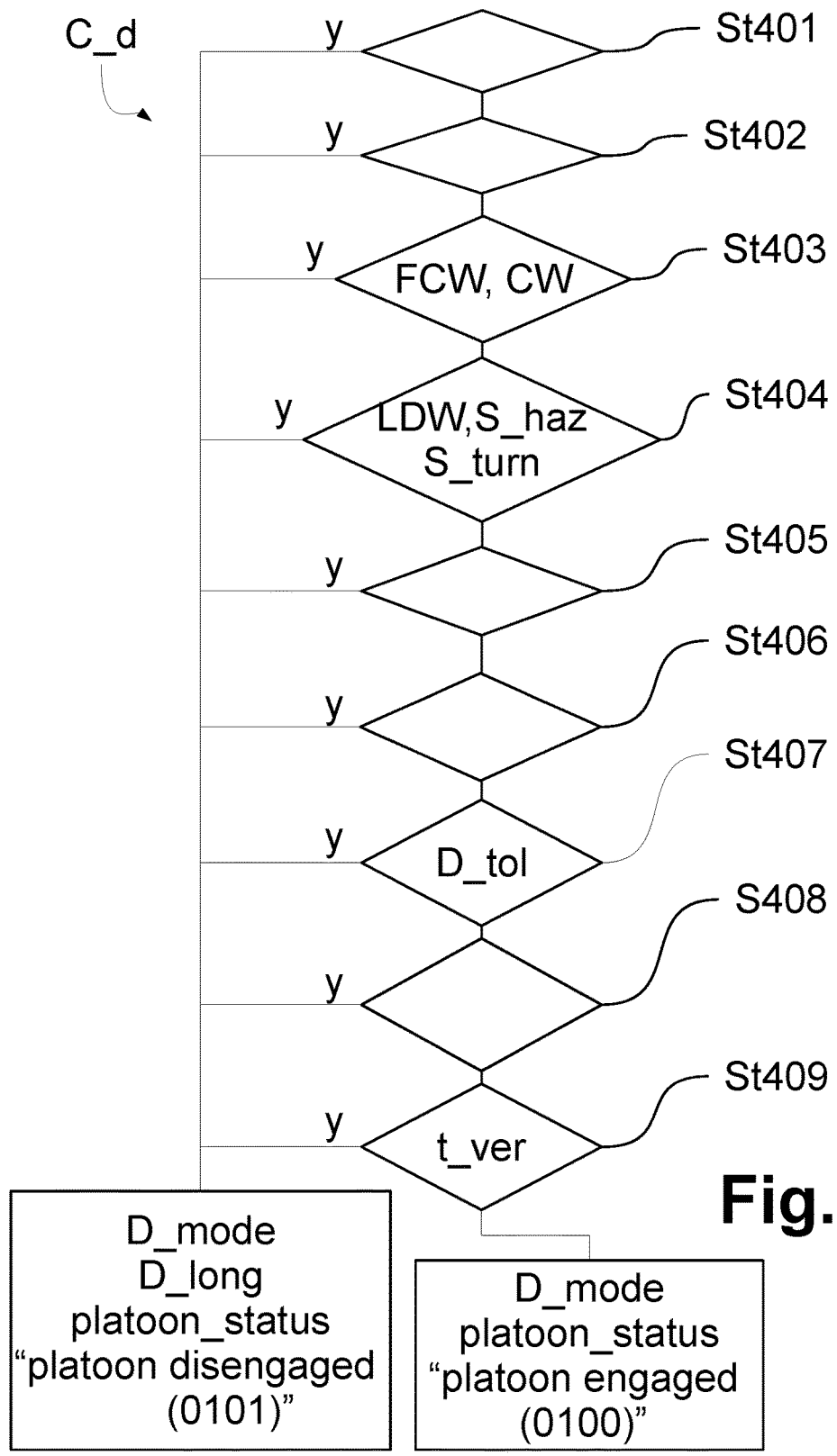
FIG. 7 shows a flow chart for disengaging a platoon according to an embodiment of the invention.

Disengaging a platoon 100 can be performed if certain disengagement conditions C_d are met, which are depicted in FIG. 7. In a first disengagement-step St401 it is checked, if the driver presses the braking pedal 201. In a second disengagement-step St402 it is checked, if the adaptive cruise control system 204 shuts off or is overridden. In a third disengagement-step St403 it is checked, if there is a forward collision warning FCW or any other collision warnings CW between level 0 and 8 outputted by the advanced emergency braking system 205. In a forth disengagement-step St404 it is checked, if there is a lane departure warning LDW or if a turn-signal S_turn or a hazard light signal S_haz is activated. In a fifth disengagement-step St405 it is checked, if the restriction-value platoon_authorization sends "no approval." In a sixth disengagement-step St406 it is checked, if the electronic braking-system 230 of the own vehicle 200, namely the anti-lock braking system 202, the electronic stability control 203, the adaptive cruise control system 204, the advanced emergency braking system 205 isn't working fault free any more. This is outputted by the diagnose-message M_dia. In a seventh disengagement-step St407 it is checked, if the following-distance D_follow derived from the geographical-position-value pos_gp isn't matching the following-distance D_follow outputted from the adaptive cruise control system 204 of the own vehicle 200 by a certain tolerance_distance D_tol, e.g. +/−6 m/s. In a eighth disengagement-step St408 it is checked, if the geographical-positioning-value pos_gp indicate that the vehicles 200, 300 of the platoon 100 are not driving in the same lane of travel 50 any more for more than 2 s. In a ninth disengagement-step St409 it is checked, if there is a failure in data transmission, e.g. more than three continuous packets of the DSRC-signal S1 are lost. All these conditions can be derived from the on-board communication system 220 as they appropriate values are transferred to the on-board communication system 220 of the own vehicle 200.

If one of these disengagement-conditions C_d is met, the platoon-status-value platoon-status is set to "platoon disengaged" and reported on PGN 65280. Simultaneously the communication module 210 sets a distance mode D_mode which requests to hold the longest possible following distance D_long to the other vehicle 300 in front. Further the platoon-position-value platoon_position is set to "not platooning". The distance calculation of the following-driving-distance D_drive_follow and the lead-driving-distance D_drive_lead is stopped and stored in the memory 260. From now on only the adaptive cruise control system 204 combined with the advanced emergency braking system 205 is responsible for the longitudinal control of the own vehicle 200. If no disengagement-conditions C_d is met, the own vehicle 200 remains participant of the platoon 100.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

| REFERENCE SIGNS | |
|---|---|
| 10 | lead vehicle |
| 20, 30 | follower vehicles |
| 40 | wireless vehicle-to-vehicle (V2V) communication |
| 100 | platoon |
| 200 | own vehicle |
| 201 | braking pedal |
| 202 | anti-lock braking system (ABS) |
| 203 | electronic stability control (ESC) |
| 204 | adaptive cruise control (ACC) |
| 205 | advanced emergency braking system (AEBS) |
| 206 | cruise control system (CC) |
| 210 | communicaton device |
| 211 | on-board interface |
| 212 | DSRC-radio |
| 220 | on-board communication system |
| 230 | electronic braking system |
| 240 | powertrain-system |
| 250 | processor |
| 260 | memory |
| 300 | other vehicle |
| 400 | external communication system |
| C_d | disengagement-conditions |
| C_e | engagement-conditions |
| C_id | identification-conditions |
| C_ini | initiation-conditions |
| conf_brake | brake-performance-value |
| CW | collision warning |
| D_drive_following | following-driving-distance |
| D_drive_lead | lead-driving-distance |
| D_follow | following-distance |
| D_long | long following distance |
| D_med | medium following distance |
| D_mode | distance-mode |
| D_stop | stopping-distance |
| D_short | short following distance |
| D_tol | tolerance-distance |
| FCW | forward collision warning |
| ID | unique identifier |
| LDW | lane departure warning |
| M_brake | brake-configuration-message |

-continued

| REFERENCE SIGNS | |
|---|---|
| M_dia | diagnose-message |
| M_ex | external message |
| M_DSRC | DSRC-messages |
| M_gp | geographical-position-message |
| M_ID | vehicle-identification-message |
| M_onboard | on-board-messages, e.g. CAN-message |
| M_position | platoon-position-message |
| M_rest | restriction-message |
| M_status | platoon-status-message |
| platoon_authorization | restriction-value |
| platoon_position | platoon-position-value |
| platoon_status | platoon-status-value |
| pos_gp | geographical-position-value |
| R | signal-transmittal-range |
| R.i | stopping distance performance rank |
| S1 | DSRC-signal |
| S2 | control-signals |
| S_turn | turn-signal |
| S_haz | hazard-light-signal |
| v_200 | vehicle speed of own vehicle 200 |
| v_max | maximum vehicle speed |
| v_pre | pre-defined vehicle speed |
| t_ver | verification-time |
| St101, St102, St103, St104 | initiation-steps |
| St201, St202, St203, St204, St205, St206, St207 | identification-steps |
| St301, St302, St303, St304, St305 | engagement-steps |
| St401-St409 | disengagement-steps |

What is claimed is:

1. A method for controlling an own vehicle to participate in platoon with at least one other vehicle, wherein the own vehicle and the at least one other vehicle each having communication devices configured to wirelessly transmit DSRC-signals over a vehicle-to-vehicle communication link between each other, the method comprising:
checking initiation-conditions to determine if the own vehicle is ready for platooning, wherein the checking of the initiation-conditions comprises monitoring on-board messages transmitted over an on-board-communication system of the own vehicle;
identifying at least one other vehicle in signal-transmittal-range to determine if the at least one other vehicle is ready for platooning and the at least one other vehicle is a valid platooning partner, wherein the identification of the at least one other vehicle comprises monitoring DSRC-messages wirelessly transmitted over the vehicle-to-vehicle-communication between the at least one other vehicle and the own vehicle by the DSRC-signal;
requesting to an adaptive cruise control system to hold a following-distance between the own vehicle and the at least one other vehicle to form a platoon if the at least other vehicle is ready for platooning and is a valid platooning partner and if the own vehicle is assigned as a following vehicle, wherein an assignment as a following vehicle is made if a brake-performance-value of the own vehicle transmitted as an on-board message over the on-board-communication system contains a higher stopping distance performance rank as the brake-performance-value of the at least other vehicle transmitted as an DSRC-message over the vehicle-to-vehicle-communication.

2. The method according to claim 1, wherein checking of the initiation-conditions, identifying the at least one other vehicle, determining if the own vehicle is a following vehicle and requesting the following-distance is controlled by the communication device by:
receiving and monitoring a brake-configuration-message, a geographical-position-message, a vehicle-identification-message, a platoon-status-message, and a platoon-position-message as DSRC-messages wirelessly transmitted by the DSRC-signal,
receiving and monitoring a diagnose-message, an unique identifier of the own vehicle, a brake-performance-value of the own vehicle and a geographical position of the own vehicle transmitted by the on-board-communication system, and
receiving and monitoring external-messages transmitted by an external communication system.

3. The method according to claim 1, wherein checking initiation-conditions comprises:
determining if the electronic braking system of the own vehicle is working properly by determining if the anti-lock braking system, the electronic stability control, and the adaptive cruise control system combined with the advanced emergency braking system are working fault free by monitoring a diagnose-message transferred over the on-board-communication system of the own vehicle.

4. The method according to claim 1, wherein checking initiation-conditions further comprises the steps of:
determining if the anti-lock braking system and the electronic stability control are fully operational;
determining if the cruise control system of the own vehicle is activated.

5. The method according to claim 1, wherein checking initiation-conditions further comprises determining if no disengagement-condition is met, wherein a disengagement-condition is met if the driver presses the braking pedal or if the adaptive cruise control system shuts off or is overridden or if there is a forward collision warning or any other collision warnings outputted by the advanced emergency braking system or if there is a lane departure warning or if a turn-signal or a hazard light signal is activated or if a restriction-value sends "no approval" or if the diagnose-message is indicating that the electronic braking system is not working fault free any more or if the following-distance derived from a geographical-position-value is not matching the following-distance outputted from the adaptive cruise control system of the own vehicle within a tolerance-distance or if the geographical-positioning-value indicates that the own vehicles and the at least one other vehicle are not driving in the same lane of travel any more for more than 2s or if there is a failure in data transmission of the DSRC-signal.

6. The method according to claim 1, wherein checking initiation-conditions further comprises determining if the driver of the own vehicle is drowsy.

7. The method according to claim 1, wherein identifying the at least one other vehicle further comprises the step of determining a platoon-status-value contained in the platoon-status-message wirelessly received from the at least one other vehicle over the DSRC-signal, wherein the at least one other vehicle is classified as a valid partner if the at least one other vehicle is ready and initiated.

8. The method according to claim 1, wherein identifying the at least one other vehicle further comprises:
monitoring the brake-performance-value of the at least one other vehicle wirelessly broadcasted over the DSRC-signal, wherein the at least one other vehicle is classified as a valid partner if the at least one other vehicle driving in front has transmitted a lower stopping distance performance rank over the DSRC-signal relative to the stopping distance performance rank of the own vehicle transmitted over the vehicle-to-vehicle-communication, or the at least one other vehicle driving behind has transmitted a higher stopping distance performance rank over the DSRC-signal relative to the stopping distance performance rank of the own vehicle transmitted over the vehicle-to-vehicle-communication.

9. The method according to claim 1, wherein identifying the at least one other vehicle further comprises the step of determining the unique identifier contained in the vehicle-identification-message wirelessly broadcasted over the DSRC-signal, wherein the at least one other vehicle is classified as a valid partner, if the same or a friendly unique identifier is wirelessly broadcasted by the at least one other vehicle.

10. The method according to claim 1, wherein identifying the at least one other vehicle further comprises determining if the same or a friendly unique identifier is wirelessly broadcasted by more than two vehicles in signal-transmittal-range, wherein in this case filtering of the own vehicle and the at least one other vehicle is done based on their geographical-position-value contained in the geographical-position-message broadcasted over the DSRC-signal to identify the position of the own vehicle relative to the at least one other vehicle, wherein the at least one other vehicle is classified as a valid partner, if the at least other vehicle is driving in the same lane of travel.

11. The method according to claim 1, wherein identifying the at least one other vehicle further comprises the step of comparing the following-distance derived from the geographical-position-value to the following-distance outputted from the adaptive cruise control system.

12. The method according to claim 1, wherein requesting the adaptive cruise control system to hold a following-distance is done only if:
the own vehicle is driving at a vehicle-speed equal to or less than a maximum vehicle-speed or equal or higher than a minimum vehicle-speed;
the own vehicle and the other vehicle are ready for platooning and the other vehicle is classified as a valid partner; and
transmission of DSRC-signals is consistent over a verification-time.

13. The method according to claim 1, wherein before requesting the adaptive cruise control system to hold a following-distance a restriction-value contained in the restriction-message is checked,
wherein the adaptive cruise control system is requested to hold a short following distance as the following-distance of the own vehicle relative to the at least one other vehicle if the restriction-value comprises "no restrictions";
wherein the adaptive cruise control system is requested to hold a medium following distance as the following-distance of the own vehicle relative to the at least one other vehicle if the restriction-value comprises "limited approval"; and
wherein the adaptive cruise control system is requested to hold a long following distance as the following-distance of the own vehicle relative to the at least one other vehicle if the restriction-value comprises "no approval".

14. The method according to claim 1, wherein the following-distance request to hold by the adaptive cruise control system is set in dependence of the traffic, the weather or environmental data.

15. The method according to claim 1, wherein the own vehicle is disengaged from the platoon if a disengagement condition is met, wherein a disengagement-condition is met if the driver presses the braking pedal or if the adaptive cruise control system shuts off or is overridden or if there is a forward collision warning or any other collision warnings outputted by the advanced emergency braking system or if there is a lane departure warning or if a turn-signal or a hazard light signal is activated or if a restriction-value sends "no approval" or if the diagnose-message is indicating that the electronic braking system is not working fault free any more or if the following-distance derived from a geographical-position-value is not matching the following-distance outputted from the adaptive cruise control system of the own vehicle within a tolerance-distance or if the geographical-positioning-value indicates that the own vehicles and the at least one other vehicle are not driving in the same lane of travel any more for more than 2 s or if there is a failure in data transmission of the DSRC-signal.

16. The method according to claim 1, wherein determining if the own vehicle is assigned as a following vehicle of the platoon is further done in dependence of the vehicle mass of the own vehicle or the driving behavior of the driver of the own vehicle.

17. A communication device, comprising:
an on-board-interface operable to physically connect to an on-board-communication system of an own vehicle to receive on-board messages and to transmit control-signals;
a DSRC-radio operable to wirelessly transmit and receive DSRC-messages over the DSRC-signal;
a processor to monitor the on-board messages and the received DSRC-messages to generate a DSRC-signal and a control-signal in dependence of the received on-board messages and the received DSRC-messages.

18. A vehicle comprising:
a communication device;
an on-board communication system;
an electronic braking system;
an anti-lock braking system;
an electronic stability control;
an adaptive cruise control combined with an advanced emergency braking system; and
a powertrain-system;
wherein the communication device is operable to control the vehicle to participate in a platoon by analyzing a DSRC-signal received from a vehicle-to-vehicle communication and analyzing messages transmitted over the on-board-communication system of an own vehicle and transmitting a control-signal over the on-board communication system.

* * * * *